US006938577B2

(12) United States Patent
Kraft et al.

(10) Patent No.: US 6,938,577 B2
(45) Date of Patent: Sep. 6, 2005

(54) SYSTEM FOR MOVING FEEDERS AND/OR DRINKERS WITHIN A LIVESTOCK HOUSE

(75) Inventors: James Richard Kraft, New Paris, IN (US); Roger S. Kiphart, Warsaw, IN (US); Timothy William Momont, Wolcottville, IN (US)

(73) Assignee: CTB IP, Inc, Wilmington, DE (US)

( * ) Notice: Subject to any disclaimer, the term of this patent is extended or adjusted under 35 U.S.C. 154(b) by 141 days.

(21) Appl. No.: 10/427,771

(22) Filed: Apr. 30, 2003

(65) Prior Publication Data

US 2004/0069236 A1 Apr. 15, 2004

Related U.S. Application Data (60) Provisional application No. 60/376,522, filed on Apr. 30, 2002.

(51) Int. Cl.$^7$ ................................................ A01K 5/00
(52) U.S. Cl. ...................... 119/57.1; 119/57.4; 119/449
(58) Field of Search ............................ 119/57.1, 57.2, 119/57, 57.92, 57.4, 449, 57.7, 437

(56) References Cited

U.S. PATENT DOCUMENTS

| | | | |
|---|---|---|---|
| 2,259,876 A | | 10/1941 | Berland .......................... 119/1 |
| 2,791,200 A | | 5/1957 | Palmer, Jr. .................... 119/52 |
| 2,800,106 A | * | 7/1957 | Nelson ....................... 119/57.4 |
| 3,097,627 A | | 7/1963 | Garcia ....................... 119/51.11 |
| 3,124,104 A | * | 3/1964 | Carpenter ................. 119/51.12 |
| 3,157,158 A | | 11/1964 | Greenan .................... 119/51.11 |
| 3,202,130 A | | 8/1965 | Sutton ....................... 119/51.11 |
| 3,204,607 A | | 9/1965 | Arnold et al. ............. 119/51.11 |
| 3,234,913 A | * | 2/1966 | Haen et al. ................ 119/56.2 |
| 3,237,807 A | | 3/1966 | Garvey ......................... 222/56 |
| 3,266,462 A | | 8/1966 | Fulton, Jr. et al. ........ 119/51.11 |
| 3,306,257 A | | 2/1967 | Conover ....................... 119/16 |
| 3,419,130 A | * | 12/1968 | Ferris .......................... 198/743 |
| 3,477,407 A | | 11/1969 | Loudon ....................... 119/51 |
| 3,550,812 A | | 12/1970 | Brown .......................... 222/70 |
| 3,693,593 A | * | 9/1972 | Ackermann et al. ........ 119/57.4 |
| 3,722,475 A | | 3/1973 | Wittern et al. ............ 119/51.11 |
| 3,942,479 A | * | 3/1976 | Powers ....................... 119/52.1 |
| 4,082,064 A | * | 4/1978 | Newell, III ............... 119/51.11 |
| 4,153,010 A | * | 5/1979 | Erfeling ...................... 119/57.1 |
| 4,223,638 A | * | 9/1980 | Sappington et al. ........ 119/57.6 |
| 4,320,825 A | * | 3/1982 | Buschbom et al. .......... 198/360 |
| 4,527,513 A | * | 7/1985 | Hart et al. .................. 119/51.5 |
| 4,672,917 A | * | 6/1987 | Fox ............................ 119/57.1 |
| 4,722,301 A | * | 2/1988 | Strong ........................ 119/57.4 |
| 4,781,148 A | * | 11/1988 | Gamliel ...................... 119/487 |
| 4,815,417 A | * | 3/1989 | Strong ........................ 119/57.4 |
| 4,887,550 A | | 12/1989 | Pirovano ................... 119/56.2 |
| 5,069,165 A | * | 12/1991 | Rousseau .................... 119/57.6 |
| 5,076,212 A | * | 12/1991 | Thompson et al. ......... 119/437 |
| 5,505,160 A | * | 4/1996 | Pellerin ...................... 119/57.1 |
| 5,513,597 A | * | 5/1996 | Pollock ....................... 119/57.4 |
| 5,964,185 A | * | 10/1999 | DeBonne et al. .......... 119/57.4 |
| 6,526,914 B2 | | 3/2003 | Korsten |
| 6,591,780 B2 | * | 7/2003 | Fujii .......................... 119/57.4 |
| 6,779,486 B2 | * | 8/2004 | Vaags ....................... 119/51.11 |

FOREIGN PATENT DOCUMENTS

| | | | | |
|---|---|---|---|---|
| DE | 3419108 | | 11/1985 | .............. 119/51.04 |
| DE | 3438612 | | 4/1986 | .............. 119/51.11 |

* cited by examiner

*Primary Examiner*—Yvonne R. Abbott
(74) *Attorney, Agent, or Firm*—Trexler, Bushnell, Giangiorgi, Blackstone & Marr, Ltd.

(57) ABSTRACT

A system for moving feeders and/or drinkers within a livestock house that has a plurality of items suspended from the ceiling of the livestock house. The system includes structure for supplying feed and/or water to the feeders and/or drinkers, respectively, structure for adjusting a height of the feeders and/or drinkers relative to a floor of the livestock house, and structure for transversely moving the feeders and/or drinkers within the livestock house. Operation of the different structures of the system within the livestock house does not interfere with the items suspended from the ceiling of the livestock house.

29 Claims, 8 Drawing Sheets

SYSTEM FOR MOVING FEEDERS AND/OR DRINKERS WITHIN A LIVESTOCK HOUSE

CROSS-REFERENCE

This patent application claims the benefit of domestic priority of U.S. Provisional Application Ser. No. 60/376,522, filed Apr. 30, 2002, and entitled "Improvements To A Moving Feeding And Watering System".

BACKGROUND OF THE INVENTION

The present invention relates to a system for providing feed and/or water to livestock within a livestock house. More specifically, the present invention relates to a system for providing feed and/or water to livestock within a livestock house which moves laterally within the livestock house.

In a livestock house, for instance a poultry house, feeders and drinkers are supplied which provide feed and water, respectively, to the livestock. The feeders are typically supplied with feed by a feed line which extends longitudinally through the livestock house. The feed line receives feed from a fill system typically located outside of the livestock house. The drinkers are typically supplied with water by a watering line which is connected to a main water supply.

Within the livestock house, the feeders and drinkers are located in a fixed position in the longitudinal and transverse directions. The feeders and drinkers, however, are capable of being moved vertically relative to a floor of the livestock house to a desired position, which may depend upon the size of the livestock within the livestock house. The feeders and drinkers can also be moved vertically relative to the floor of the livestock house in order to allow machinery to be used within the livestock house for clearing or cleaning the livestock house.

A number of problems have been associated with the feeders and drinkers being positioned in fixed positions in the longitudinal and transverse directions within the livestock house. When livestock are present in the livestock house, the livestock gather around the feeders and/or drinkers such that an increased amount of excrement is left by the livestock proximate to the feeders and/or drinkers than in other areas of the livestock house. Further, the water from the drinkers tends to be spilled near the drinkers, such that the areas surrounding the drinkers is typically very moist. Because of this, the living conditions of the livestock in the livestock house are not optimal.

Further, it has been observed that when the feeders are positioned in one place within a poultry house, dominant birds will stand by the feeders and try to prevent other smaller birds from gaining access to the feed at the feeders, thus causing the birds to either fight or causing the growth rate of some of the birds to be slower than for other birds.

One known United States patent, namely U.S. Pat. No. 6,526,914 to Korsten, has attempted to overcome these problems by providing equipment for a poultry house which allows water and/or feed bowls to move in a transverse direction within the poultry house. While this patent overcomes many of these problems, the structure described in the patent causes other problems.

The '914 patent was invented for the purpose of using the invention within poultry houses in Northern Europe. In Northern Europe, poultry houses are typically formed to have heating and cooling ventilation systems formed in the sidewalls thereof such that the poultry houses are open span houses which have no obstructions hanging from the ceiling thereof. The poultry houses in Northern Europe also typically have flat ceilings.

Conversely, in the United States of America and in other parts of Europe, the poultry houses generally do not have heating and cooling ventilation systems built into the structure thereof. Rather, the poultry houses typically have space heaters, brooders and fans suspended from the ceiling of the poultry house for proper heating and ventilation of the poultry house. Further, these poultry houses typically have a triangular roof system which has a number of trusses extending below to provide structural support for the poultry houses. Thus, the invention described in the '914 would not be able to operate as illustrated and described in a poultry house in the United States of America or parts of Europe other than Northern Europe.

The '914 patent describes a system for moving feeders (11) and drinkers (10) transversely within a poultry house (1). The system uses a drive shaft (14) to travel transversely along a plurality of racks (6) and guide rails (7). A winching tube (17) is secured to the drive shaft (14) by a plate (23) such that the winching tube (17) is distanced from the drive shaft (14) at a constant distance. Cables (8) are secured to the winching tube (17) and support the feed conduit (9) and the feeders (11) and drinkers (10), such that as the drive shaft (14) travels transversely within the poultry house (1), the feed conduit (9), the feeders (11) and the drinkers (10) also move transversely within the poultry house (1).

As the poultry houses in Northern Europe do not have any obstructions hanging from the ceiling or roof thereof, the fact that the drive shaft (14), the winching tube (17), the feed conduit (9), the feeders (11) and the drinkers (10) are all generally provided for in the same vertical plane, does not impede the system from moving transversely within the poultry house to move the feeders (11) and the drinkers (10) from one side of the poultry house (1) to the other. However, if the system of the '914 patent were placed into a poultry house in the United States of America or other parts of Europe, the system would not be able to operate effectively because all of the parts which move transversely within the poultry house (1) are positioned generally within the same vertical plane.

Figure 1:
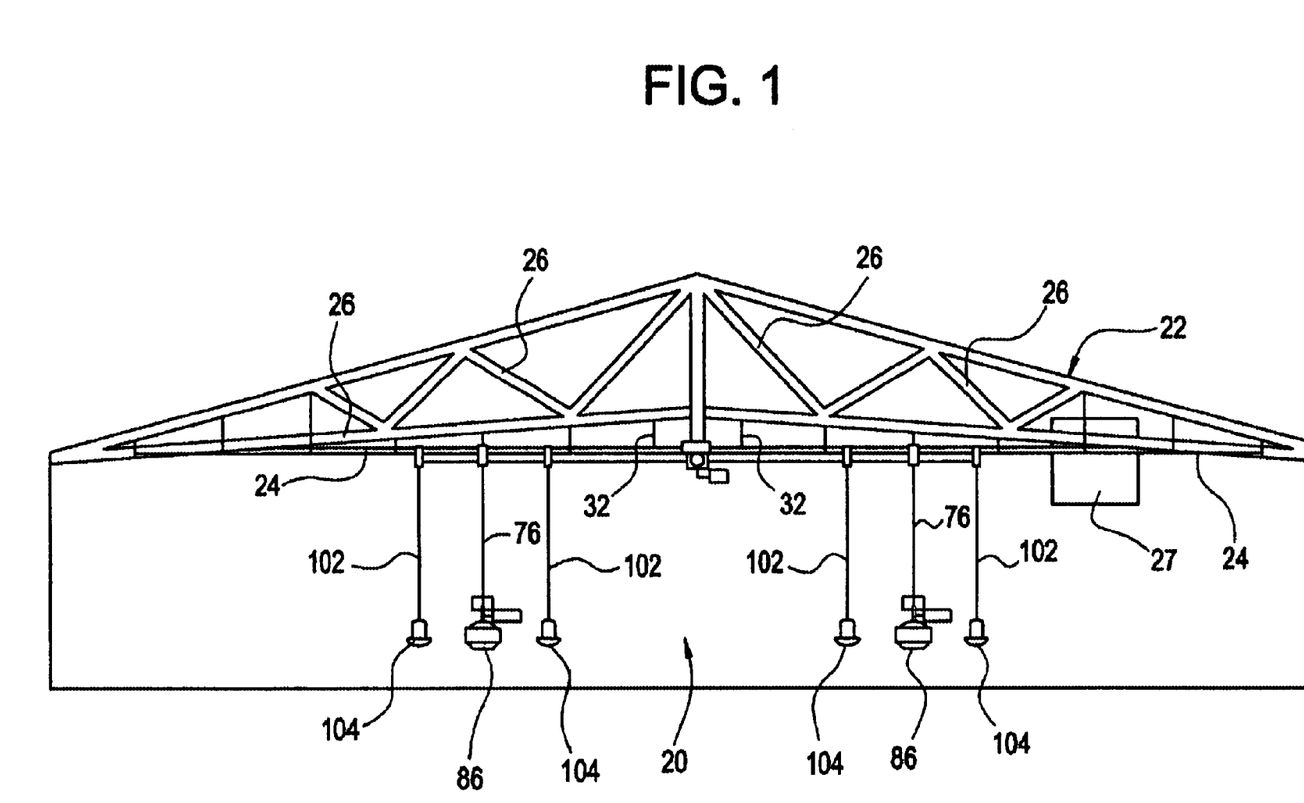
FIG. 1 is a side-elevational view of a livestock house illustrating a portion of the system for moving feeders and/or drinkers within the livestock house.

If an item is hung from the ceiling of a poultry house in the United States of America, like that shown in FIG. 1, the system would only allow for transverse movement up until the point at which the system, i.e., the drive tube (14) or the winching tube (17) came into contact with the item suspended from the ceiling, thus, effectively preventing the system from moving the feeders (11) and drinkers (10) to as wide a transverse expanse as desired. The winching tube (17) being kept at a constant distance from the drive (14) would also impede the ability of the system to move transversely within such a poultry house having obstacles suspended or hung from the ceiling thereof.

The invention described in the '914 also suffers from a number of other disadvantages. For instance, the feeders and the drinkers are not separated from one another by a large enough distance such that condensation from the drinkers can come onto the feeder to cause rusting of the feed lines, a buildup of activity around the drinkers and feeders can occur, and the drinkers cannot be raised or lowered independently of the feeder line such that a heavy drinker cannot be supported.

Therefore, an improved system for moving feeders and/or drinkers within a livestock house is needed. The present invention provides such a system. Features and advantages of the present invention will become apparent upon a reading of the attached specification, in combination with a study of the drawings.

OBJECTS AND SUMMARY OF THE INVENTION

A primary object of the invention is to provide a system for moving feeders and/or drinkers within a livestock house having items suspended from the ceiling thereof.

Another object of the invention is to provide a system for moving feeders and/or drinkers within a livestock house which will provide for improved living conditions of the livestock within the livestock house.

Another object of the invention is to provide a system for moving feeders and/or drinkers within a livestock house which can be custom fit to any livestock house, no matter whether items are suspended from the ceiling of the livestock house.

Yet another object of the invention is to provide a system for moving feeders and/or drinkers within a livestock house which minimizes any torque forces during operation of the system.

Still another object of the invention is to provide a system for moving feeders and/or drinkers within a livestock house where the drinkers are sufficiently separated from the feeders such that condensation from the drinkers does not come onto the feeders such that rusting of the feed lines can be caused.

Another object of the invention is to provide a system for moving feeders and/or drinkers within a livestock house where the drinkers are sufficiently separated from the feeders in order to prevent a buildup of activity around the drinkers and feeders.

Yet another object of the invention is to provide a system for moving feeders and/or drinkers within a livestock house where the drinkers are sufficiently separated from the feeders such that the drinkers can be raised and lowered independently of the feeder line and can support a heavy drinker.

Another object of the invention is to provide a system for moving feeders and/or drinkers within a livestock house where the drinkers are sufficiently separated from the feeders such that the main water supply can be fixed in the ceiling with flexible hose lines stemming from the ceiling to the drinkers.

Another object of the invention is to provide a system for moving feeders and/or drinkers within a livestock house where the drinkers are sufficiently separated from the feeders such that appropriate room is provided for the livestock to eat and drink.

Yet another object of the invention is to provide a system for moving feeders and/or drinkers within a livestock house which is easily repairable or replaceable.

Another object of the invention is to provide a system for moving feeders and/or drinkers within a livestock house which has an emergency shut-off system associated therewith.

Still another object of the invention is to provide a system for moving feeders and/or drinkers within a livestock house which provides a money savings in the amount of feed and water used in the livestock house.

Another object of the invention is to provide a system for moving feeders and/or drinkers within a livestock house which results in an overall increase in the weight of the livestock in the livestock house.

Yet another object of the invention is to provide a system for moving feeders and/or drinkers within a livestock house, namely a poultry house, such that improved behavior of the poultry in the poultry house results in a more uniform flock.

Another object of the invention is to provide a system for moving feeders and/or drinkers within a livestock house which provides improved livability for the livestock within the livestock house.

Briefly, and in accordance with the foregoing, a system for moving feeders and/or drinkers within a livestock house that has a plurality of items suspended from the ceiling of the livestock house. The system includes structure for supplying feed and/or water to the feeders and/or drinkers, respectively, structure for adjusting a height of the feeders and/or drinkers relative to a floor of the livestock house, and structure for transversely moving the feeders and/or drinkers within the livestock house. Operation of the different structures of the system within the livestock house does not interfere with the items suspended from the ceiling of the livestock house.

BRIEF DESCRIPTION OF THE DRAWINGS

The features of the present invention which are believed to be novel are described in detail hereinbelow. The organization and manner of the structure and operation of the invention, together with further objects and advantages thereof, may best be understood by reference to the following description taken in connection with the accompanying drawings wherein like reference numerals identify like elements in which.

DETAILED DESCRIPTION OF THE ILLUSTRATED EMBODIMENT

While this invention may be susceptible to embodiment in different forms, there is shown in the drawings and will be described herein in detail, a specific embodiment with the understanding that the present disclosure is to be considered an exemplification of the principles of the invention, and is not intended to limit the invention to that as illustrated and described herein.

Figure 2:
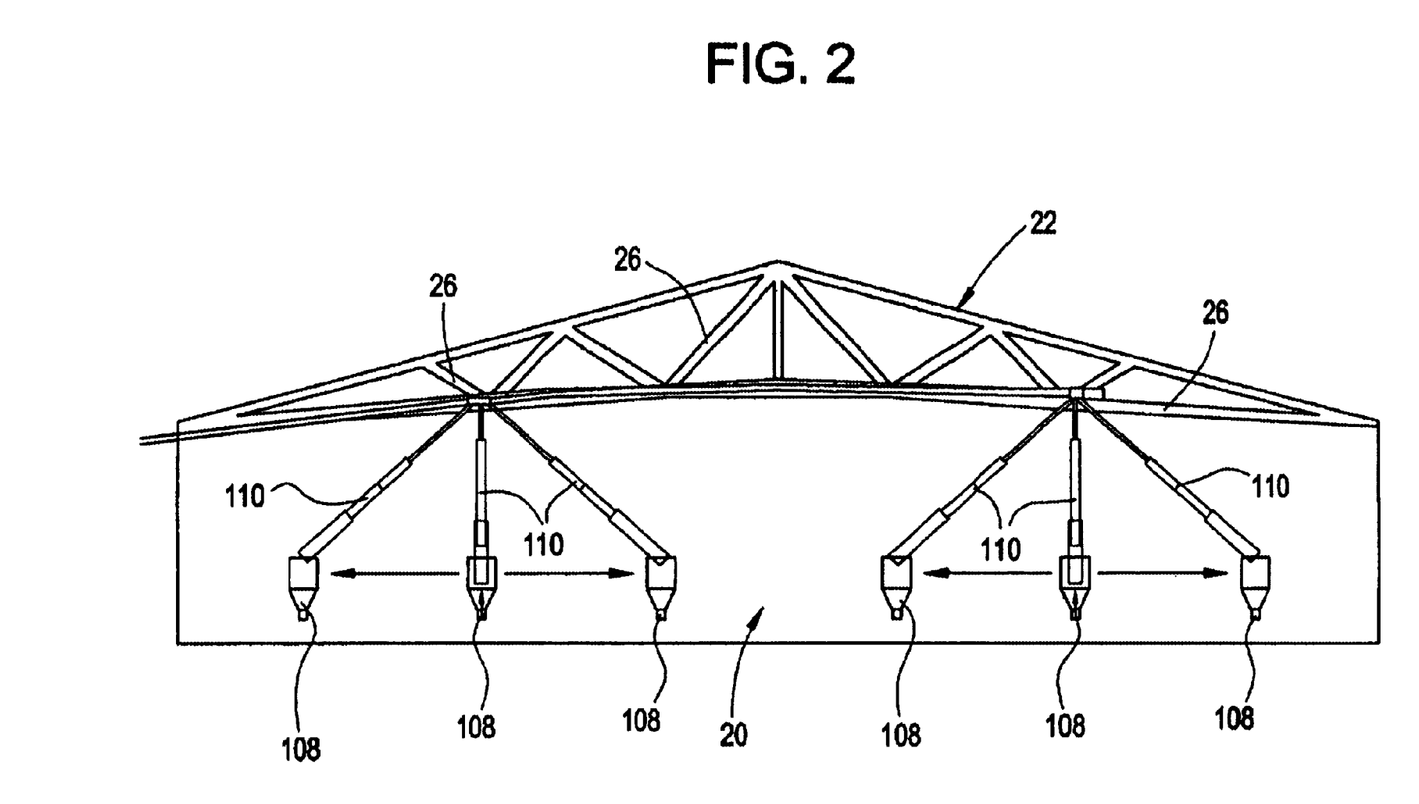
FIG. 2 is a side-elevational view of a livestock house illustrating another portion of the system for moving feeders and/or drinkers within the livestock house.

A system 20 for moving watering and/or feeding lines to different positions in a livestock house 22 is provided, as best illustrated in FIGS. 1 and 2. It should be noted that the system 20 is preferably to be used in a poultry house 22 and will be discussed in relation thereto, but the system 20 could also be utilized in other types of livestock houses.

Figure 3:
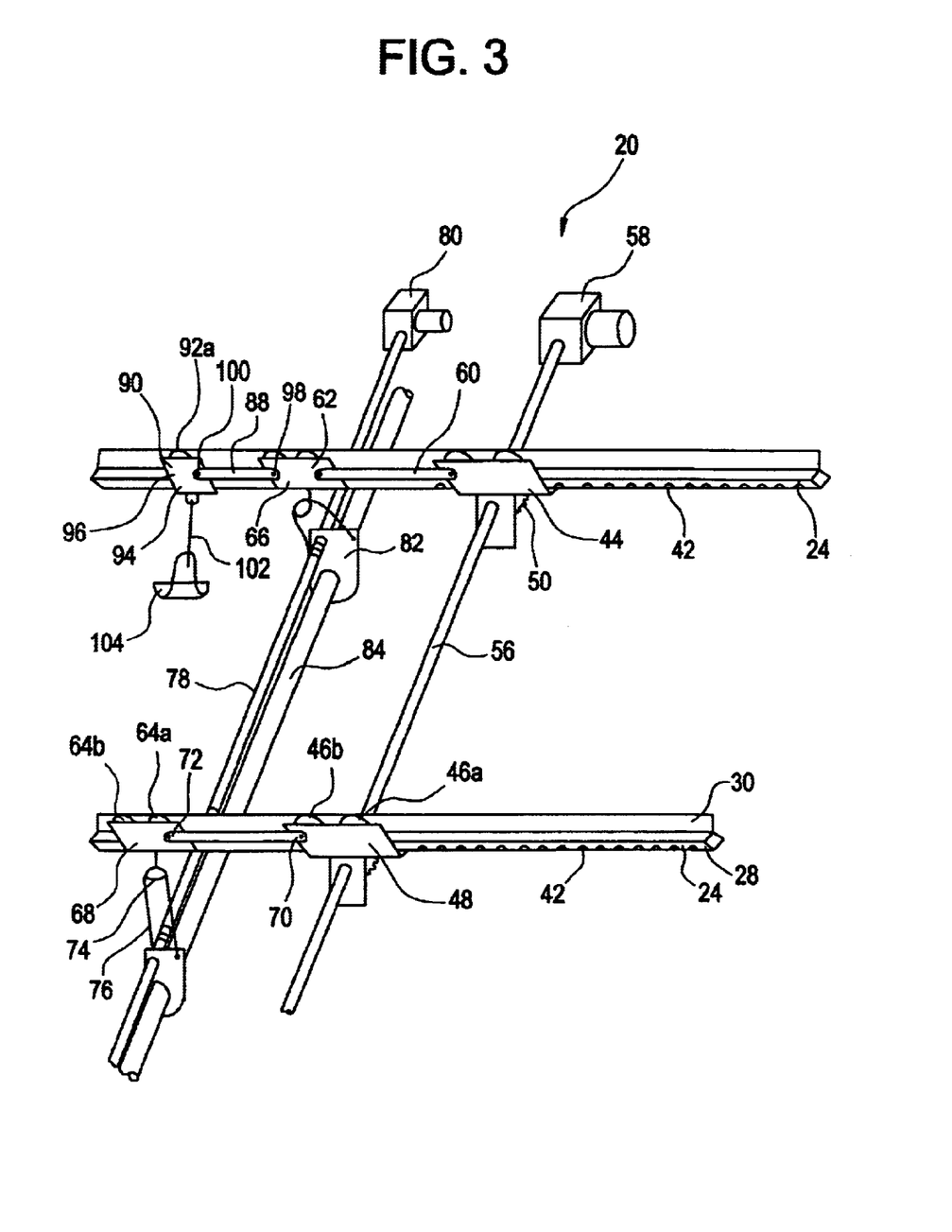
FIG. 3 is a perspective view of the system for moving feeders and/or drinkers within the livestock house.
Figure 4:
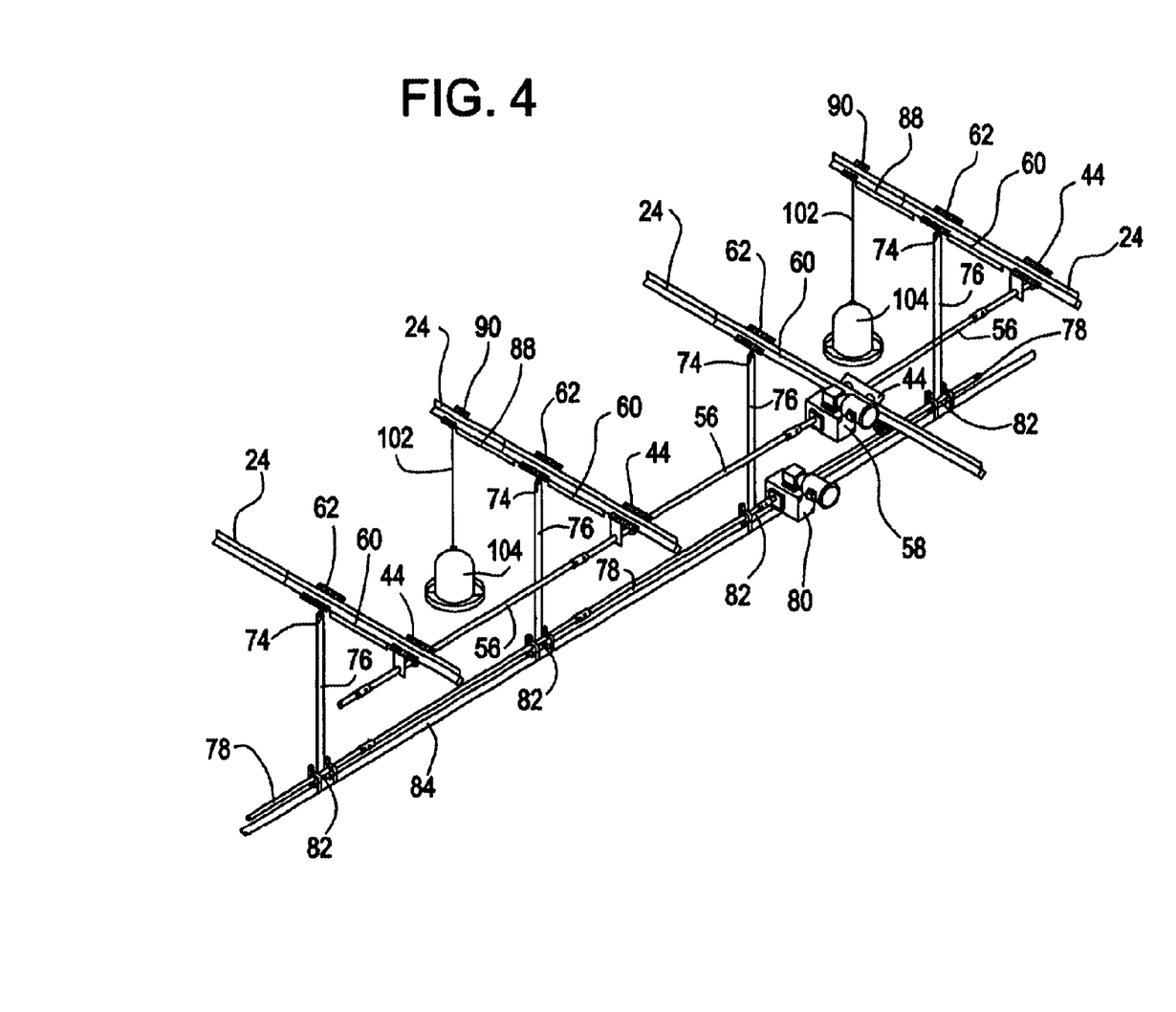
FIG. 4 is an alternative perspective view of the system for moving feeders and/or drinkers within the livestock house.

The system 20 includes a plurality of track members 24 which are suspended from the trusses 26 or the ceiling of the poultry house 22, as best illustrated in FIGS. 1, 3 and 4. The track members 24 are generally positioned transversely in the poultry house 22 and are positioned a predetermined distance from one another. The track members 24 are preferably positioned such that they are not proximate to items 27 hanging down from the ceiling of the poultry house 22, such as heaters and fans.

Figures 5, 7, 8:
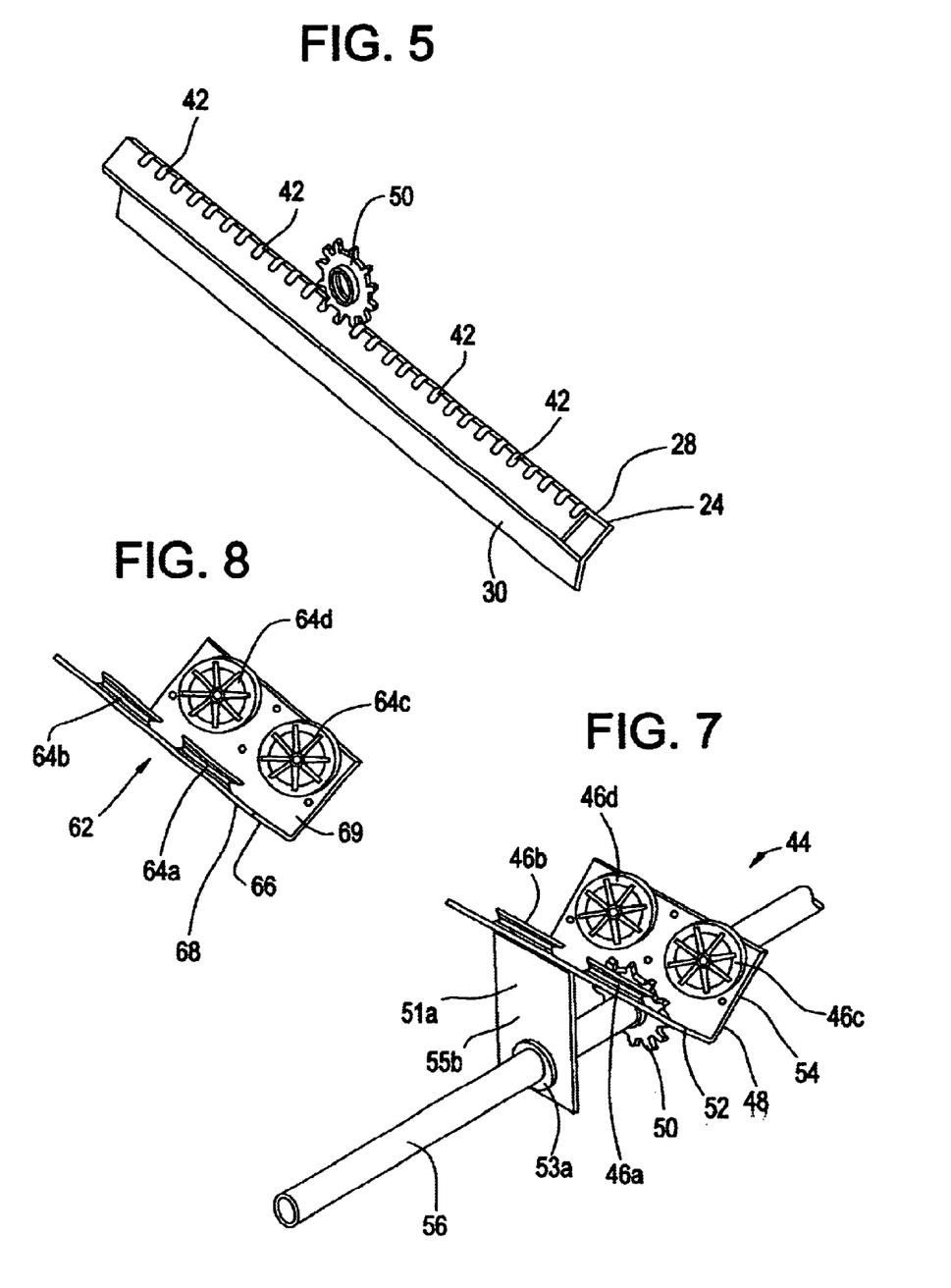
FIG. 5 is a perspective view of a track member and a drive sprocket which are components of the system for moving feeders and/or drinkers within the livestock house.
FIG. 7 is a perspective view of a trolley member which is a component of the system for moving feeders and/or drinkers within the livestock house.
FIG. 8 is a perspective view of a feeder trolley member which is a component of the system for moving feeders and/or drinkers within the livestock house.
Figure 6:
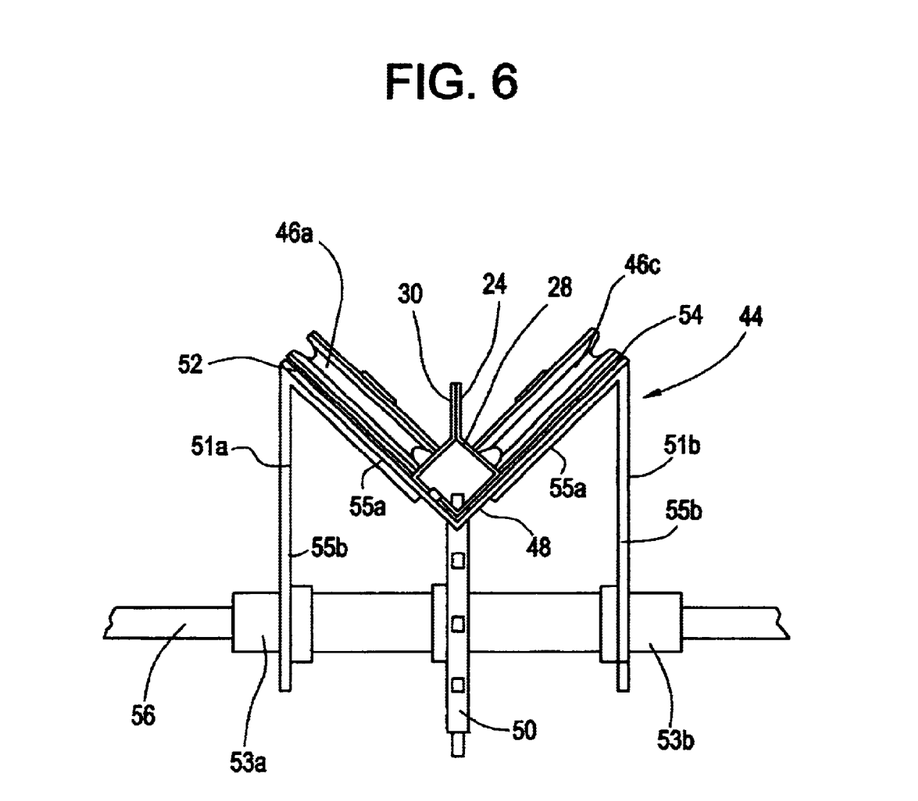
FIG. 6 is a side-elevational view of a trolley member, drive tube and track member, which are components of the system for moving feeders and/or drinkers within the livestock house.

Each track member 24, as illustrated in FIGS. 5 and 6, preferably has a hollow member 28 which is square in cross-section and an extension member 30 which extends from the connection of first and second sides of the hollow member 28. The extension member 30 is preferably positioned vertically such that the hollow member 28 appears diamond-like in shape. The extension member 30 is capable of being connected to a first end of a plurality of link members 32, such as chains. Opposite ends of the link members 32 are capable of being connected either to hook means provided on the trusses 26 or ceiling of the poultry house 22, or to a truss bracket (not shown) which can be connected to the trusses 26 of the poultry house 22, as illustrated in FIG. 1.

The truss bracket may be configured to have a first portion (not shown) which extends on a back side of the truss 26, a second portion (not shown) which extends from the first portion over the top of the truss 26 and outwardly therefrom, and a third portion (not shown) which extends back down to a front side of the truss 26 at approximately a forty-five degree angle. The third portion is attached to the truss 26 by appropriate means. Proximate to the connection of the second and third portions, the truss bracket has a keyhole opening (not shown) therethrough which allows for the selective adjustment and locking of the chain or link member 32 such that the track member 24 will be held aloft and to provide for easier assembly of the system 20.

The track member 24 further includes a plurality of notches or openings 42 therethrough along the length of the track member 24, as illustrated in FIG. 5. The openings 42 are preferably formed at a corner of the track member 24 where third and fourth sides of the track member 24 meet. The purpose for the openings 42 will be described in more detail herein.

A first trolley member 44 can also be positioned around and supported by the track member 24. The first trolley member 44 is best illustrated in FIGS. 3 and 6–7. The trolley member 44 preferably has four pulleys 46, a V-shaped plate 48, a drive sprocket 50, a pair of angled plates 51a, 51b, and a pair of bearings 53a, 53b. The first and second pulleys 46a, 46b are positioned such that they can roll along the first side of the track member 24 while the third and fourth pulleys 46c, 46d are positioned such that they can roll along the second side of the track member 24. The first and second pulleys 46a, 46b are rotatably attached to a first portion 52 of the V-shaped plate 48 which extends parallel to, and beyond, the third side of the track member 24. The third and fourth pulleys 46d are rotatably attached to a second portion 54 of the V-shaped plate 48 which extends parallel to, and beyond, the fourth side of the track member 24. The V-shaped plate 48 further has an opening therethrough where the first and second portions 52, 54 meet.

The drive sprocket 50 is capable of extending through the opening of the V-shaped plate 48 and of meshing with the notches or openings 42 of the track member 24.

Each of the angled plates 51a, 51b have first and second portions 55a, 55b which are connected to one another at an angle. The first portion 55a of the angled plate 51a is connected to the first portion 52 of the V-shaped plate 48 such that the second portion 55b of the angled plate 51a hangs below the V-shaped plate 48. Likewise, the first portion 55a of the angled plate 51b is connected to the second portion 54 of the V-shaped plate 48 such that the second portion 55b of the angled plate 51b hangs below the V-shaped plate 48. The second portions 55b of the angled plates 51a, 51b have openings therethrough which are sized to receive the bearings 53a, 53b, respectively.

A system drive tube or "spline" 56 is generally positioned lengthwise in the poultry house 22 and is positioned through openings provided in the drive sprockets 50 and the bearings 53a, 53b. The system drive tube 56 is capable of being rotated both clockwise and counterclockwise by a drive unit 58 which is attached to the drive tube 56. The rotation of the drive tube 56 by the drive unit 58 causes the movement of the trolley members 44 along the length of the track members 24.

A connecting arm 60 is connected to, and extends between each trolley member 44 and a feeder trolley member 62, as best illustrated in FIGS. 3 and 4. Typically, the connecting arm 60 expands at least the length of an item hanging down from the ceiling of the poultry house 22 such that the trolley member 44, and thus, the drive tube 56, need only travel transversely along the track members 24 until approaching the items hanging from the ceiling of the poultry house 22. The feeder trolley member 62 is then free to travel transversely along the track member 24 on the opposite side of the item hanging from the ceiling. The feeder trolley members 62 are similar to the trolley member 44 described hereinabove, and are best illustrated in FIGS. 3, 4 and 8. The feeder trolley members 62 preferably have four pulleys 64 and a V-shaped plate 66. The first and second pulleys 64a, 64b are positioned such that they can roll along the first side of the track member 24 while the third and fourth pulleys 64c, 64d are positioned such that they can roll along the second side of the track member 24. The first and second pulleys 64a, 64b are rotatably attached to a first portion 68 of the V-shaped plate 66 which extends parallel to, and beyond, the third side of the track member 24. The third and fourth pulleys 64c, 64d are rotatably attached to a second portion 69 of the V-shaped plate 66 which extends parallel to, and beyond, the fourth side of the track member 24. A first end 70 of the connecting arm 60 is connected to the first portion 52 of the V-shaped plate 48 of the trolley member 44 and a second end 72 of the connecting arm 60 is connected to the first portion 68 of the V-shaped plate 66 of the feeder trolley member 62.

A pulley 74 is hung from the V-shaped plate 66 of the feeder trolley member 62, as illustrated in FIG. 3. A winch cable 76 is capable of being wrapped around the pulley 74, as illustrated in FIGS. 1, 3, 4 and 9. A first end of the winch cable 76 is connected to a winch tube 78 which extends lengthwise throughout the poultry house 22. The winch tube 78 is capable of being rotated both clockwise and counterclockwise by a winch power unit 80 which is attached to the winch tube 78. Rotation of the winch tube 78 causes the winch cable 76 to either wrap around the winch tube 78 in a double-back to raise the winch tube 78 or to unwrap from the winch tube 78 from the double-back to lower the winch tube 78.

Figure 9:
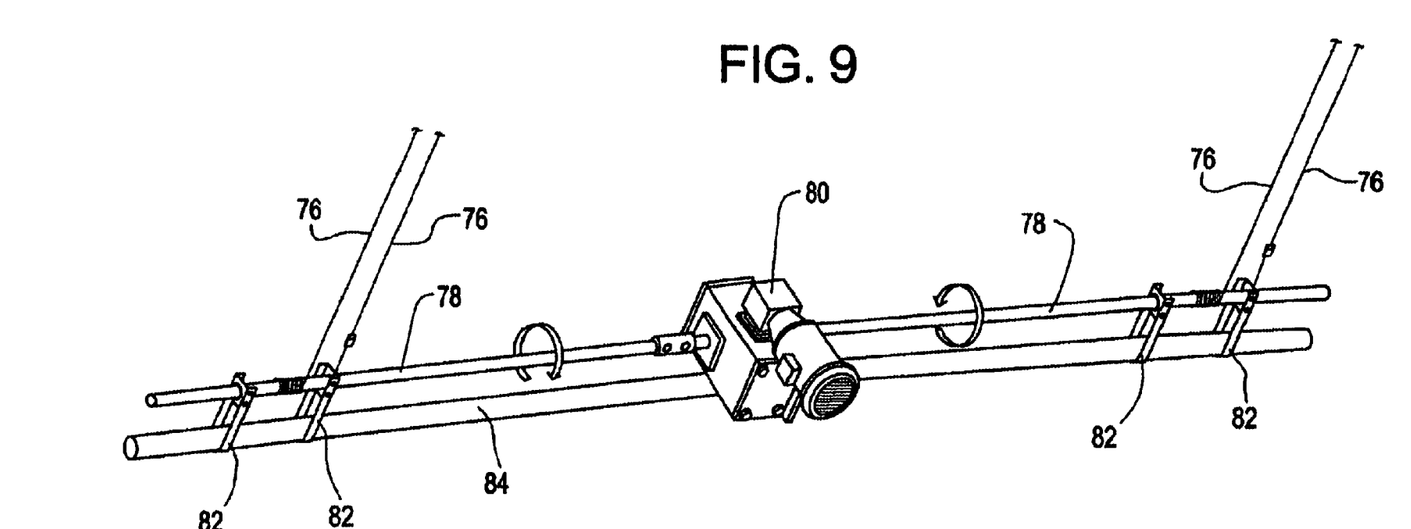
FIG. 9 is a perspective view of a winching portion of the system for moving feeders and/or drinkers within the livestock house.

The winch tube 78 is also positioned through a coupling member 82. The coupling member 82 also is capable of accepting a feed line 84, such that the feed line 84 extends lengthwise through the poultry house 22 at a position below the winch tube 78. A second end of the pulley 74 is connected to the coupling member 82 such that when the winch tube 78 is raised, the feed line 84 will also be raised and such that when the winch tube 78 is lowered, the feed line 84 is also lowered. The feed line 84 is capable of supporting a plurality of feeders 86 along a length thereof for presenting feed provided by the feed line 84 to the feeders 86 to the poultry in the poultry house 22.

Thus, as the feeder trolley member 62 is connected to the trolley member 44, the feeder trolley member 62 is capable of moving along the track member 24 as the trolley member 44 is moved along the track member 24 because the connecting arm 60 will push or pull the feeder trolley member 62. As the feeder trolley member 62 moves laterally along the length of the track member 24, both the winch tube 78 and the feed line 84 also move laterally within the poultry house 22.

A connecting arm 88 is connected to, and extends between the feeder trolley member 62 and a drinker trolley member 90, as illustrated in FIGS. 1, 3 and 4. The drinker trolley member 90 is similar to the trolley members 62, 44 described hereinabove. The drinker trolley member 90 preferably has two pulleys 92, and a V-shaped plate 94. The first pulley 92a, is positioned such that it can roll along the first side of the track member 24 while the second pulley 92b is positioned such that it can roll along the second side of the track member 24. The first pulley 92a is rotatably attached to a first portion 96 of the V-shaped plate 94 which extends parallel to, and beyond, the third side of the track member 24. The second pulley is rotatably attached to a second portion 97 of the V-shaped plate 94 which extends parallel to, and beyond, the fourth side of the track member 24. A first end 98 of the connecting arm 88 is connected to the first portion 68 of the V-shaped plate 66 of the feeder trolley member 62 and a second end 100 of the connecting arm 88 is connected to the first portion 96 of the V-shaped plate 94 of the drinker trolley member 90.

Figure 10:
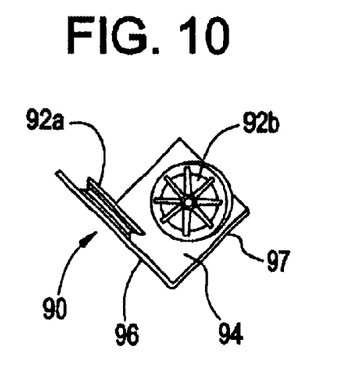
FIG. 10 is a perspective view of a drinker trolley member which is a component of the system for moving feeders and/or drinkers within the livestock house.

A cable 102 is hung from the V-shaped plate 94 of the drinker trolley member 90. A drinker 104 is hung from the cable 102 and is provided water from a water line (not shown) such that the poultry in the poultry house 22 can drink water from the drinker 104 as desired.

Thus, as the drinker trolley member 90 is connected to the feeder trolley member 62, the drinker trolley member 90 is capable of moving along the track member 24 as the feeder trolley member 62 is moved along the track member 24 because the connecting arm 88 will push or pull the drinker trolley member 90. As the drinker trolley member 90 moves laterally along the length of the track member 24, the drinker 104 also moves laterally within the poultry house 22.

It should be noted that the drinker trolley member 90 could be positioned between the feeder trolley member 62 and the trolley member 44 rather than the feeder trolley member 62 being positioned between the drinker trolley member 90 and the trolley member 44. Preferably, the position of the drinker trolley member 90 relative to the feeder trolley member 62 is alternated along every track member 24, as illustrated in FIG. 1, such that the position of the drinkers 104 are alternated relative to the feeders 86 along every track member 24.

The feed line 84 receives feed from a hopper member 108, illustrated in FIG. 2. The hopper member 108 receives the feed from a drop tube 110 which enters the poultry house 22 via a fill system (not shown) of a type which is generally well known in the art. The drop tube 110 is capable of telescoping such that it can collapse within itself in order to allow the hopper member 108 to be raised or lowered, whenever the feed line 84 is raised or lowered because of the rotation of the winch tube 78. The drop tube 110 is also capable of bending such that the hopper member 108 can move laterally in the poultry house 22 as the feed line 84 moves laterally in the poultry house 22, as illustrated in FIG. 2.

Figure 11:
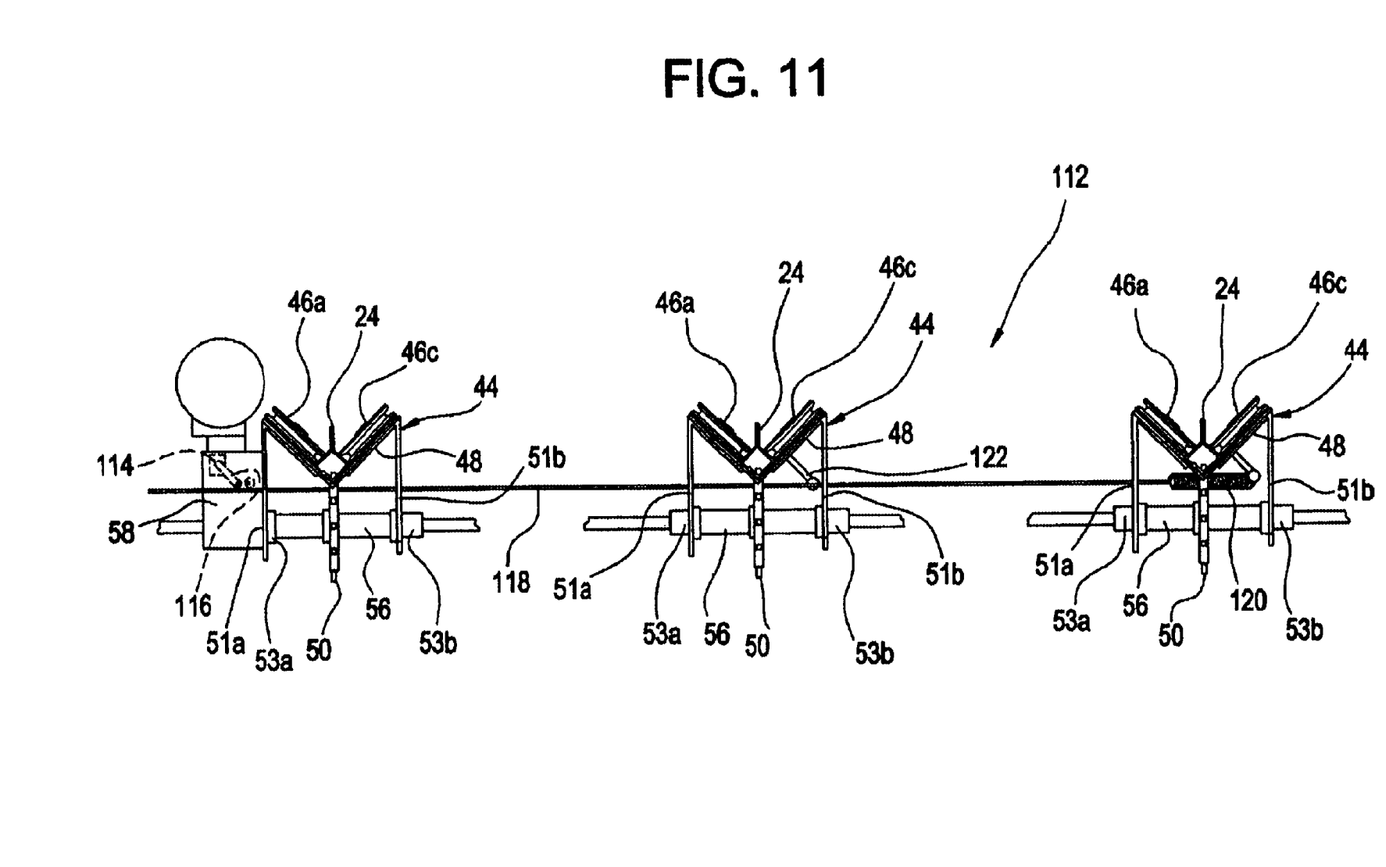
FIG. 11 is a side-elevational view of an emergency shut-off system used in connection with the system for moving feeders and/or drinkers within the livestock house.

In a preferred embodiment, the system 20 will have an emergency shut-off system 112, as illustrated in FIG. 11, which includes a switch 114 positioned on the drive unit 58. The system 112 further includes a rod member 116 extends from the switch 112. At an opposite end of the rod member 116, the rod member 116 is connected to cable 118. From the connection of the rod member 116 to the cable 118, the cable 118 extends along the length of the poultry house 22 a predetermined distance in one direction from the rod member 116 and a predetermined distance along the length of the poultry house 22 in the opposite direction. If necessary, the cable 118 can extend a longer predetermined distance in one of the directions than in the other, for example, 50 feet in one direction and 30 feet in another direction.

At each end of the cable 118, the cable 118 is attached to a spring member 120 which, in turn, is attached to the V-shaped plate 48 of one of the trolley members 44. Between the rod member 116 and the spring member 120, the cable 118 extends through a plurality of eye-bolts 122 which extend from other V-shaped plates 48 of the trolley members 44.

The system drive tube 56 is positioned lengthwise in one or more locations of the poultry house 22 and is capable of moving transversely along a plurality of track members 24 for a predetermined number of feet in an area that is free of obstacles hanging down from the ceiling of the poultry house 22. Trolleys 62, 90 from which the winch tubes 78, feed lines 84, feeders 86, and drinkers 104 are suspended, are positioned on either side of the drive tube 56 and are connected to the drive tube 56 by the connecting arms 60, 88 which can be of any length desired such that the system 20 can be custom fit to any poultry house 22. In any event, the trolleys 62, 90 and cables 76, 102 are positioned such that they can generally move between locations near the wall of the poultry house 22 and any items hanging down from the ceiling of the poultry house 22. In summary, the system 20 is versatile such that it can be set up and operated in several different types of poultry houses 22 without interference from items typically hanging from the ceiling of the poultry house 22, such as fans or heaters.

The winch power unit 80 is typically positioned in the middle of the poultry house 22 and two separate winch tubes 78a, 78b extend outwardly from the winch power unit 80, one toward the front of the house 22 and one toward the back of the house 22. The winch power unit 80 has a beveled gear box (not shown) therein which is configured, as is well known in the art, to rotate the tubes 78a, 78b in opposite directions. The purpose for the beveled gear box and the opposite rotation of the winch tubes 78*a*, 78*b* is to neutralize the torque placed on the system 20 by the rotation of the winch tubes 78*a*, 78*b*. This is especially important with regard to this type of system 20 which is set up to "float" in a poultry house 22 and is therefore very susceptible to adverse torque forces. Thus, in summary, the system 20 minimizes any torque forces on the system 20.

The winch tubes 78 are attached to the feed lines 84 by the coupling member 82 such that the distance between the feed lines 84 and the winch tubes 78 is close and kept constant. Such a configuration allows for an abundance of clearance above the system 20 when the system 20 is lowered and assists in the objective of avoiding suspended obstacles such as fans and heaters as discussed herein.

The truss brackets preferably extend outwardly from a front side of the truss 26 to allow clearance for the trolleys 44, 62, 90 to run next to the truss 26.

In the system 20, the drinkers 104 are typically suspended about one foot above the ground, but can be adjusted by hand. The drinkers 104 are suspended from a drinker trolley 90 that has a loop hanging below it through which the watering line (not shown) can extend. The watering line has enough slack in it such that the drinker 104 can move a predetermined distance to the right and a predetermined distance to the left. The drinker trolleys 90 can also be placed on either side of the feeder trolleys 62 (generally 3 to 4 feet away) as desired, usually in an alternating manner.

The separation of the drinkers 104 from the feeders 86 has a number of benefits. First, condensation from the drinkers 104 does not come onto the feeders 86 which can cause rusting of the feed lines 84. Second, the separation of the drinkers 104 from the feeders 86 helps to prevent a buildup of activity around the drinkers 104 and feeders 86. Third, the drinkers 104 can be raised and lowered independently of the feeder line 84 and can support a heavy drinker. Fourth, the system 20 allows the main water supply to be fixed in the ceiling with flexible hose or water lines 106 stemming therefrom to the drinkers. Fifth, the separation of the drinkers 104 and the feeders 86 provides appropriate room for birds to eat and drink.

The drive tube 56 is also preferably separated into a plurality of predetermined length extensions which are connected together such that simple replacement of the shafts is allowable should one of the shafts become worn or broken.

With the feed coming into the poultry house 22 via the fill system, the feed enters the telescoping drop tube 110. The telescoping drop tube 110 is capable of collapsing within itself in order to allow the hopper 108 to be raised, whenever the feed lines 84 are raised. A flexible top portion of the telescoping drop tube 110 is also capable of bending to approximately a 40 degree angle to either the left or the right to accommodate for the lateral movement of the feed line 84, such that the supply hopper 108 can travel a predetermined length to the left or a predetermined length to the right. In this manner, the telescoping drop tube 110 is also needed for side-to-side travel because as the hopper 108 is moved from side-to-side, the drop tube 110 needs to telescope out to reach the hopper 108 and then needs to collapse when the hopper 108 returns to a center position.

The track members 24 also only need the slots 42 provided therein for the length of the track member 24 in which the drive tube 56 will move such that installation time and material expenses are saved.

The emergency shut-off system 112, illustrated in FIG. 11, also may be provided to stop the system 20 from moving. The system 20 may need to be stopped as it is possible for the drive tube 56 extending in one direction of the house 22 to stop rotating, due to a failure in connection, while the drive tube 56 extending in the opposite direction of the house 22 continues to rotate. If this situation were to occur, the feed line 84 would be bound up and could potentially cause damage to the system 20 and the poultry house 22.

If the system 20 is working properly, the emergency shut-off system 112 does not affect the operation of the system 20. If, however, the system 20 fails in the manner described above, the cable 118 will be pulled by the system 20, as the cable 118 is attached to the trolleys 44, such that the cable 118 will pull the rod member 116 to trigger the switch 114. By triggering the switch 114, the switch 114 will stop the drive unit 58 from moving the drive tube 56, thus preventing the binding of the feeder lines 84.

This system 20 has provided a number of benefits. One such benefit is a money savings in the amount of feed and water used in the poultry house 22 with the system 20 in place. Another such benefit is an overall increase in the weight of the birds in the poultry house 22 with the system 20 in place.

This system 20 has also provided improved behavior of the birds in the poultry house 22 resulting in a more uniform flock. Typically, when the feeders are positioned in one place, it has been found that dominant birds will stand by the feeders and try to prevent other smaller birds from gaining access to the feed at the feeders, thus causing the birds to either fight or causing the growth rate of some of the birds to be slower than for other birds. With the present system 20, it has been found that as the feeders 86 move from side to side, the dominant birds generally do not follow the feeders 86, but rather tend to stay in one place and wait for the feeders 86 to come to them, thus allowing the small birds to easily gain access to the feeders 86.

Further, it has been found that the livability of the birds is increased in a poultry house 22 having the system 20 in place.

While a preferred embodiment of the present invention is shown and described, it is envisioned that those skilled in the art may devise various modifications of the present invention without departing from the spirit and scope of the appended claims.

What is claimed is:

1. A system for moving feeders and/or drinkers within a livestock house, the livestock house having a ceiling and items suspended from the ceiling, said system comprising:

means for supplying feed and/or water to the feeders and/or drinkers, respectively, said supplying means including a feed line which is operatively associated with each of the feeders, said feed line extending longitudinally within the livestock house; and means for transversely moving said feed line and the feeders and/or drinkers within the livestock house;

wherein said supplying means, and said moving means are configured such that operation of said supplying means, and said moving means within the livestock house does not interfere with the items suspended from the ceiling of the livestock house.

2. A system as defined in claim 1, further including an emergency shut-off system which is configured to stop said moving means from moving upon a failure of a portion of said moving means.

3. A system as defined in claim 1, further including means for adjusting a height of said feed line and the feeders and/or drinkers relative to a floor of the livestock house, said adjusting means being configured such that operation thereof within the livestock house does not interfere with said at least one item suspended from the ceiling of the livestock house.

4. A system as defined in claim 1, wherein said moving means includes a drive tube which extends longitudinally within the livestock house, said drive tube being provided at a predetermined distance from said feed line within the livestock house.

5. A system as defined in claim 1, wherein said moving means includes at least one track member which extends transversely within the livestock house.

6. A system for moving feeders and/or drinkers within a livestock house, the livestock house having a ceiling and items suspended from the ceiling, said system comprising:

means for supplying feed and/or water to the feeders and/or drinkers, respectively, said supplying means includes a feed line which is operatively associated with each of the feeders in order to provide feed to each of the feeders, a hopper member which is operatively associated with the feed line in order to provide feed to said feed line, a drop tube which is operatively associated with the hopper member in order to provide feed to said hopper member, and a fill system which is operatively associated with said drop tube in order to provide feed to said drop tube;

means for adjusting a height of the feeders and/or drinkers relative to a floor of the livestock house; and means for transversely moving the feeders and/or drinkers within the livestock house;

wherein each of said supplying means, said adjusting means, and said moving means are configured such that operation of said supplying means, said adjusting means and said moving means within the livestock house does not interfere with the items suspended from the ceiling of the livestock house.

7. A system as defined in claim 6, wherein said drop tube is configured to telescope such that a height of said hopper member can be adjusted upon said adjusting means adjusting said height of the feeders.

8. A system as defined in claim 6, wherein said drop tube is configured to bend such that a lateral position of said hopper member can be changed upon said moving means moving the feeders transversely within the livestock house.

9. A system for moving feeders and/or drinkers within a livestock house, the livestock house having a ceiling and items suspended from the ceiling, said system comprising:

means for supplying feed and/or water to the feeders and/or drinkers, respectively, said supplying means includes a feed line;

means for adjusting a height of the feeders and/or drinkers relative to a floor of the livestock house; and means for transversely moving the feeders and/or drinkers within the livestock house, said moving means includes, a plurality of track members which extend transversely within the livestock house, each said track member having a plurality of notches extending along a predetermined length thereof, a drive tube which extends longitudinally within the livestock house, means for rotating said drive tube, a plurality of drive sprockets, said drive tube being connected to, and extending through, each of said drive sprockets, each said drive sprocket capable of meshing within said notches of one of said plurality of track members upon rotation of said drive tube such that said drive tube is capable of moving laterally within the livestock house along said plurality of track members, and a plurality of trolley means for connecting said drive tube to said adjusting means, said adjusting means being connected to said supplying means;

wherein each of said supplying means, said adjusting means, and said moving means are configured such that operation of said supplying means, said adjusting means and said moving means within the livestock house does not interfere with the items suspended from the ceiling of the livestock house.

10. A system as defined in claim 9, wherein said rotating means is a drive motor operatively associated with said drive tube.

11. A system as defined in claim 9, wherein said plurality of track members are hung from trusses and/or the ceiling of the livestock housing.

12. A system as defined in claim 9, said system further including an emergency shut-off system for stopping lateral movement of said drive tube along said plurality of track members when a first portion of said drive tube stops rotating and a second portion of said drive tube continues to rotate.

13. A system as defined in claim 9, wherein each said track member has a hollow member which is square in cross-section such that said track member has a first side, a second side, a third side, and a fourth side, said notches being provided at a connection of said third side to said fourth side.

14. A system as defined in claim 13, wherein each said trolley connecting means includes, a first trolley member operatively associated with said drive tube, a second trolley member operatively associated with said adjusting means, and a connecting member which connects said first trolley to said second trolley member a predetermined distance apart from one another.

15. A system as defined in claim 14, wherein each said second trolley member includes, a V-shaped plate having a first portion and a second portion, a first pulley rotatably attached to said first portion of said V-shaped plate, said first pulley capable of traveling along said first side of one of said track members, and a second pulley rotatably attached to said second portion of said V-shaped plate, said second pulley capable of traveling along said second side of said one track member.

16. A system as defined in claim 14, wherein each said first trolley member includes, a V-shaped plate having a first portion and a second portion, said V-shaped plate having an opening provided at a connection of said first portion to said second portion, one of said drive sprockets capable of extending through said opening of said V-shaped plate to mesh with one of said track members, a first pulley rotatably attached to said first portion of said V-shaped plate, said first pulley capable of traveling along said first side of said one track member, a second pulley rotatably attached to said second portion of said V-shaped plate, said second pulley capable of traveling along said second side of said one track member, and means for securing said V-shaped plate to said drive tube.

17. A system as defined in claim 14, said adjusting means includes,
- a plurality of pulleys, each said pulley being suspended from one of said second trolley members,
- a plurality of cables having first and second ends, each said cable capable of being wrapped around one of said pulleys suspended from said second trolley members, said second end of each said cable being connected to said feed line of said supplying means,
- a winch tube which extends longitudinally within the livestock house, said first end of each said cable being connected to said winch tube,
- means for rotating said winch tube in a first direction and a second direction such that each said cable wraps around said winch tube, and such that said winch tube and said feeding line are raised within the livestock house when said winch tube is rotated in said first direction, and such that each said cable unwraps from around said winch tube, and such that said winch tube and said feeding line are lowered within the livestock house when the winch tube is rotated in said second direction.

18. A system as defined in claim 17, wherein said rotating means is a winch power unit.

19. A system as defined in claim 17, wherein said rotating means includes a beveled gear box such that a first portion of said winch tube rotates in an opposite direction than a second portion of said winch tube.

20. A system as defined in claim 19, wherein said rotating means is positioned in a middle of the livestock house.

21. A system as defined in claim 17, wherein said winch tube and said feeding line are attached to one another by at least one coupling member such that a distance between said winch tube and said feeding line is kept constant.

22. A livestock house having a floor and a ceiling, said livestock house comprising:
- at least one item suspended from the ceiling of said livestock house; and
- a system for moving feeders and/or drinkers within said livestock house, said system including,
  - means for supplying feed and/or water to said feeders and/or drinkers, respectively;
  - means for adjusting a height of said feeders and/or drinkers relative to the floor of said livestock house, and
  - means for moving said feeders and/or drinkers within said livestock house, said moving means is suspended from at least one truss within said livestock house, said adjusting means is operatively associated with said moving means, and said supplying means is operatively associated with said adjusting means;
- wherein each of said supplying means, said adjusting means, and said moving means are configured such that operation of said supplying means, said adjusting means and said moving means within said livestock house does not interfere with said at least one item suspended from the ceiling of said livestock house.

23. A livestock house having a floor and a ceiling, said livestock house comprising:
- at least one item suspended from the ceiling of said livestock house; and
- a system for moving feeders and/or drinkers within said livestock house, said system including,
  - means for supplying feed and/or water to said feeders and/or drinkers, respectively, said supplying means including a feed line which is operatively associated with each of the feeders, said feed line extending longitudinally within the livestock house, and
  - means for moving said feed line and the feeders and/or drinkers within said livestock house,
- wherein said supplying means, and said moving means are configured such that operation of said supplying means, and said moving means within said livestock house does not interfere with said at least one item suspended from the ceiling of said livestock house.

24. A livestock house as defined in claim 23, said system further including means for adjusting a height of said feed line and the feeders and/or drinkers relative to the floor of said livestock house, said adjusting means being configured such that operation thereof within said livestock house does not interfere with said at least one item suspended from the ceiling of said livestock house.

25. A livestock house as defined in claim 23, wherein said moving means includes a drive tube which extends longitudinally within said livestock house, said drive tube being provided at a predetermined distance from said feed line within said livestock house.

26. A livestock house as defined in claim 23, wherein said moving means includes at least one track member which extends transversely within said livestock house.

27. A system for moving feeders within a livestock house, the livestock house having a ceiling and at least one item suspended from the ceiling, said system comprising:
- a plurality of track members extending transversely within the livestock house;
- a feed line operatively associated with each of the feeders, said feed line extending longitudinally within the livestock house; and
- means for moving said feed line transversely within the livestock house along said plurality of track members, said moving means including,
  - a drive tube extending longitudinally within the livestock house, said drive tube being configured to move laterally within the livestock house along said plurality of track members, said at least one item suspended from the ceiling being positioned between said feed line and said drive tube, and
  - means for connecting said feed line to said drive tube such that upon transverse movement of said drive tube along said plurality of track members said feed line is moved transversely along said plurality of track members, said transverse movement of said drive tube and said feed line not interfering with said at least one item suspended from the ceiling of the livestock house.

28. A system as defined in claim 27, wherein said connecting means includes at least one first movable member operatively associated with said feed line, at least one second movable member operatively associated with said drive tube, and a generally fixed member which connects said at least one first movable member to said at least one second movable member a predetermined distance apart from one another, said at least one first and second movable members operatively associated with one of said plurality of track members such that said at least one first and second movable members are configured to move transversely within the livestock house along said one track member.

29. A system as defined in claim 27, further including means for adjusting a height of said feed line relative to a floor of the livestock house.

* * * * *